United States Patent [19]

Nortey

[11] Patent Number: 4,744,668
[45] Date of Patent: May 17, 1988

[54] INTERNAL BATCH MIXING MACHINES WITH NON-INTERMESHING ROTORS OF INCREASED PERFORMANCE

[75] Inventor: Narku O. Nortey, Trumbull, Conn.
[73] Assignee: Farrel Corporation, Ansonia, Conn.
[21] Appl. No.: 918,155
[22] Filed: Oct. 14, 1986
[51] Int. Cl.$^4$ ............................................... B01F 7/02
[52] U.S. Cl. ......................................... 366/76; 366/77; 366/84; 366/149; 366/290; 366/300
[58] Field of Search ................. 366/77, 79, 83–86, 366/96, 97, 149, 290, 300, 318, 297, 298, 76; 425/207–209

[56] References Cited

U.S. PATENT DOCUMENTS

| | | |
|---|---|---|
| 1,200,070 | 10/1916 | Banbury . |
| 3,610,585 | 10/1971 | MacLeod et al. ............... 366/300 X |
| 4,084,263 | 4/1978 | Millauer et al. ....................... 366/84 |
| 4,300,838 | 11/1981 | Sato et al. ............................. 366/84 |
| 4,456,381 | 6/1984 | Inoue et al. ............................ 366/97 |

Primary Examiner—Timothy F. Simone
Attorney, Agent, or Firm—Parmelee, Bollinger & Bramblett

[57] ABSTRACT

Non-intermeshing four-wing and three-wing rotors for use in high intensity mixing machines of the batch type provide new sequences and new characteristics of dynamic interactions for achieving advantageously increased mixing effectiveness and strength of the rotors. These new rotors are adapted for driving at unequal speed (unsynchronized rotation) or at equal speed (synchronized rotation). In the four-wing rotors, long wings and short wings both originate from both ends of the rotor. The new four-wing and three-wing rotors intensify axial mixing action and transverse distributive mixing for causing the mixes (batches) to become more homogeneous. The markedly increased twist angles T in both types of rotors decreases the volume of material "sitting" at the center of the mixer for maximizing the dispersive mixing or high shear occurring between wing tips and wall surface of each rotor cavity. The marked increase in helix angles A enhance distributive (blending) mixing by rolling banks of material in axial directions in the rotor cavities with components of axial movement and axial flow. The larger ratios of axial wing length to rotor length increase the propelling of material from near the originating end of the long wing in an axial direction along the cavity over near to the other end of the cavity and then back again with back-and-forth zig-zag like motions for enhancing distributive mixing and blending. Randomization of blending is advantageously achieved by each rotor by rolling the banks of material back-and-forth with differing velocities in opposite directions. The new interactions of these rotors produce numerous advantages and mixing features.

30 Claims, 8 Drawing Sheets

MIXING ACTION PRODUCED IN THE TWO ROTOR CAVITIES OF THE MIXING CHAMBER

→ TRANSFER OF MATERIAL FROM ONE ROTOR
← CAVITY TO THE OTHER

THIS TRANSFER OF MATERIAL PRODUCES TRANSVERSE MIXING IN THE MIXER

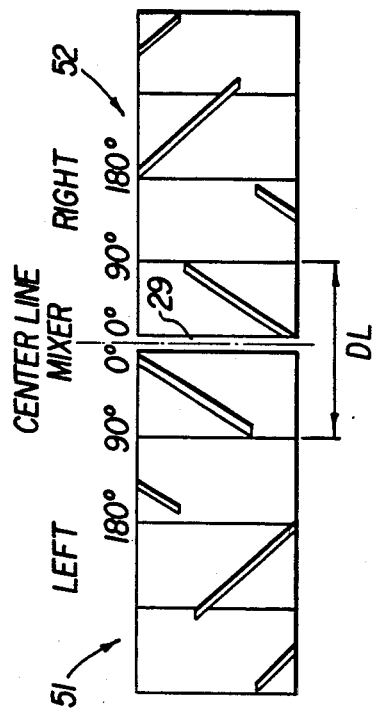
FIG.11F
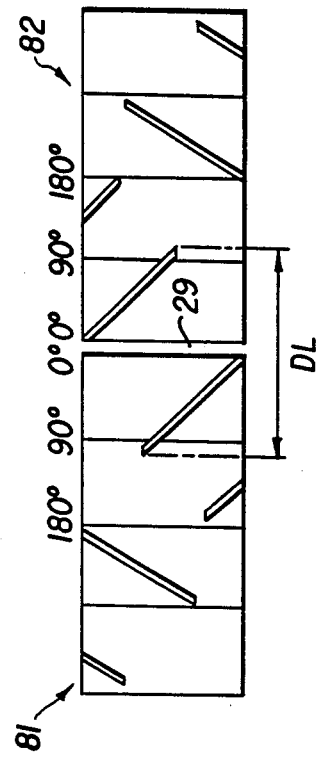
FIG.12A
FIG.12B
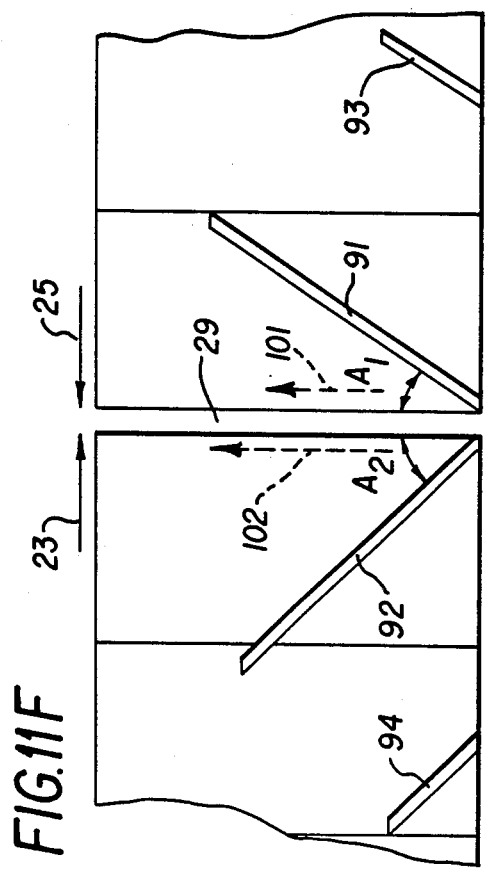
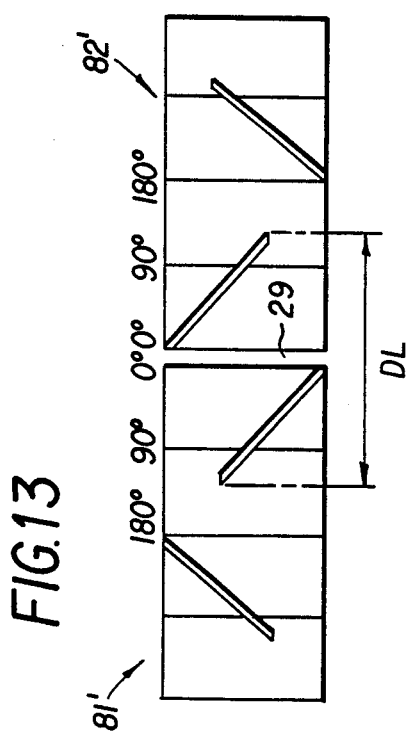
FIG.13

INTERNAL BATCH MIXING MACHINES WITH NON-INTERMESHING ROTORS OF INCREASED PERFORMANCE

BACKGROUND

This invention relates to high intensity internal mixing machines of the batch type having a mixing chamber shaped to accommodate two counter-rotating non-intermeshing winged rotors. The batch of ingredients to be mixed into a homogeneous mass is fed down into the mixing chamber through a vertical chute and is pushed down under pressure by a ram located in the chute. This ram is hydraulically or pneumatically driven. The lower face of the ram, when advanced down to its operating position during mixing of the batch, forms an upper portion of the mixing chamber. The homogeneous mixture produced is removed from the mixing chamber through a discharge opening at the bottom of the chamber, and a door associated with this opening is then closed in readiness for the next batch of ingredients to be introduced down through the chute.

Some internal batch mixing machines are designed with non-intermeshing rotors, and others have intermeshing rotors. Intermeshing rotors must always be driven at the same rotational speed in synchronized relationship; non-intermeshing rotors may be driven at the same rotational speed or at different rotational speeds for achieving different mixing and kneading effects. The present invention relates to the non-intermeshing type. The wings of the rotors have a generally helical configuration, and they produce high intensity mixing and homogenization by the cooperative interaction of their various forceful dynamic effects, as described later. For further information about such internal batch mixers, having non-intermeshing rotors, reference may be made to U.S. Pat. Nos. 1,200,070 and 3,610,585, assigned to predecessors of the present assignee; and the disclosures of these patents are incorporated herein by reference as background information.

The present invention improves the mixing performance and productivity of such high intensity internal batchtype mixing machines by providing two non-intermeshing rotors of novel configuration. The invention relates to four-wing rotors and also to three-wing rotors. In addition to the advantages resulting from their increased effectiveness, these rotors also exhibit increased strength against deflection and stress under the conditions of high torque loading which will be encountered in high intensity internal batch mixing machines of enhanced performance for use with tougher rubber and plastics materials in the future.

SUMMARY OF THE DISCLOSURE

The general object of the present invention is to enhance the effectiveness and strength of the two non-intermeshing rotors in such machines by providing new sequences and new characteristics of dynamic interactions between the counter-rotating rotors and to obtain such enhancements regardless of whether the two rotors are being turned (a) synchronized, i.e. at the same speed (equal speed) or (b) non-synchronized, i.e. at somewhat different speeds (non-equal speed), often called "friction ratio" speed.

Moreover, the general object of the invention includes achieving these advantages without considerably enlarging the volume and envelope configuration of these new rotors so that: (1) These novel rotors will fit into the mixing chambers of existing internal batch mixing machines without requiring modifications in such machines for enabling improved performance and productivity to be provided in existing machines by retrofitting with two of these new rotors; (2) These new rotors will not occupy much more volume than existing rotors for enabling the existing usable room in the mixing chamber ("the free volume") to remain available for handling substantially the same batch volume as previously; (3) These rotors are adapted for incorporation into new internal batch mixing machines wherein the mixing chamber volumes are similar to those of various sizes of such machines now in use, but wherein considerably increased power will be delivered to the new rotors for overcoming the higher forces to be generated by the tougher rubber and plastics materials to be mixed and homogenized in the future; and (4) Many of these advantages will apply to four-wing rotors as well as to three-wing rotors.

The present invention also provides a balanced shearing type of mixing at each position along the axial length of each of the two rotor chambers. In other words, the shearing action is balanced in successive sections taken through the mixing chamber perpendicular to the rotor axis; i.e. there is a uniformity of shearing action from plane-to-plane taken perpendicular to each rotor axis along the axial length of the mixing chamber.

In accordance with the present invention in certain of its aspects there are provided a pair of non-intermeshing four-wing rotors for use in high intensity internal mixing machines of the batch type as described in this specification. Each of these rotors has a driven end and a coolant end and four wings including two long wings and two short wings all having wing tips of generally helical configuration. The long wings originate from opposite ends of each rotor; that is, their leading ends are located at opposite ends of the rotor, and are oriented about the rotor axis at angular positions of 176° to 184° relative to each other. The wing tips of the first and second long wings are oriented at respective helix angles $A_1$ and $A_2$ in the ranges from 25° to 45° and from 29° to 50°, and have respective twist (wrap) angles $T_1$ and $T_2$ in the ranges from 70° to 110° and from 80° to 120°. The difference between the helix angles $A_1$ and $A_2$ has a preferred range from about 4° to about 10°, and the optimum difference is about 7° to about 8°. The helical lengths and of these two long wings is about the same. The ratio of the axial length $l_1$ of the first long wing to the rotor length L is in the range from 0.60 to 0.85. The ratio of the axial length $l_2$ of the second long wing to the rotor length L is in the range from 0.55 to 0.80. The first and second short wings originate from opposite ends of each rotor, and they are oriented at angular positions about 180° apart at their originating ends. Their leading ends are oriented at angular positions in the range from 131° to 139° behind the leading ends of the long wings which originate from the same end of the rotor. The helix angles $A_3$ and $A_4$ of the first and second short wings are about equal respectively to the helix angles $A_1$ and $A_2$, respectively, of the first and second long wings which originate from the same respective ends of the rotor. These helix angles $A_3$ and $A_4$ are in the ranges from 25° to 45° and from 29° to 50°. The twist (wrap) angles $T_3$ and $T_4$ of these two short wings are in the range from 20° to 50°. The helical lengths and of these two short wings are about the same. The ratio of the axial length $l_3$ of the first short wing to the rotor length L is in the range from 0.10 to 0.40, and the ratio of the axial length $l_4$ of the second short wing to the rotor length L is in the same range from 0.10 to 0.40.

In accordance with the invention in certain other of its aspects, new three-wing non-intermeshing rotors have a first long wing with its wing tip oriented at a first helix angle $A_1$ in the range from 25° to 45° with a first twist (wrap) angle $T_1$ in the range from 70° to 110° and with a second long wing originating at the other end of the rotor spaced angularly about 180° from the originating position of the first long wing and oriented at a second helix angle $A_2$ in the range from 30° to 50° and with a second twist angle $T_2$ in the range from 80° to 120°. The difference between the second helix angle $A_2$ and the first helix angle $A_1$ is greater than 4°, and preferably is in the range of about 4° to 8°. The ratio between the axial length $l_1$ of the first long wing and the rotor length L is in the range 0.60 to 0.85, while the ratio between the axial length $l_2$ of the second long wing to the rotor length L is in the range 0.55 to 0.80. The third wing in each of a pair of three-wing non-intermeshing rotors is a short wing having a helix angle $A_3$ in the range from 25° to 45°, with helix angle $A_3$ being generally equal to helix angle $A_1$ of the first long wing. The third wing has a twist (wrap) angle $T_3$ in the range from 20° to 50°. The ratio of the short wing length $l_3$ to the rotor length L is in the range from 0.20 to 0.50.

BRIEF DESCRIPTION OF THE DRAWINGS

The above-described and other features, objects, aspects and advantages of the present invention will become more fully understood and appreciated from the following detailed description and the appended claims, considered in conjunction with the accompanying drawings which show by way of example preferred embodiments of the present invention in contrast with certain typical rotor structures of the prior art. The same reference numbers and letters are used to indicate corresponding elements and features throughout the various views.

FIGS. 12A and 12B show the advantageously increased dwell time "DL" of the long wings of the new four-wing rotors of FIGS. 6 and 7 at the center of the mixing chamber compared with that of the rotors of FIGS. 3 and 4.

FIG. 13 similarly shows the advantageously increased dwell time "DL" of the long wings of the new threewing rotors of FIGS. 8 and 9.

DETAILED DESCRIPTION

Figure 1:
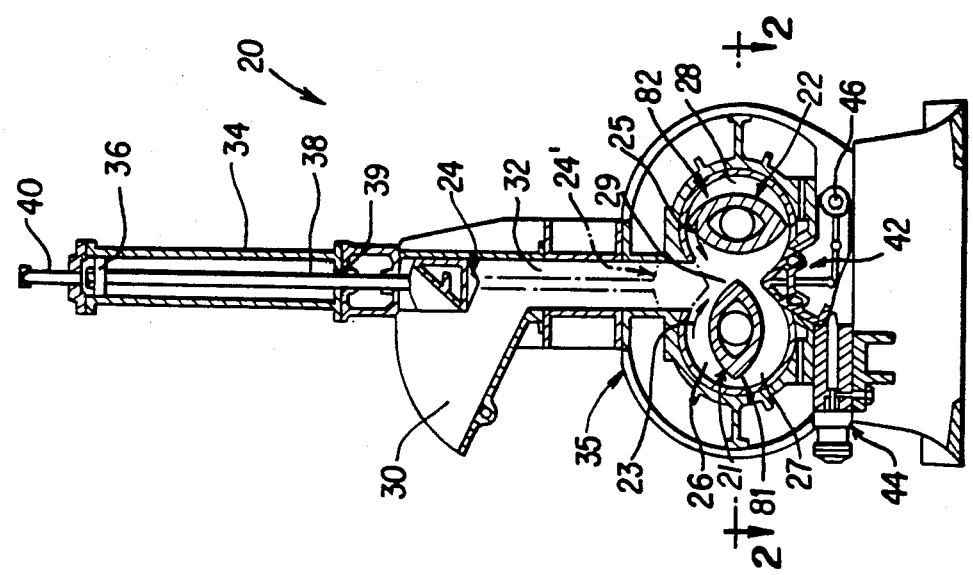
FIG. 1 is an end elevational view of an internal batch mixing machine of the non-intermeshing rotor type described embodying the present invention. Portions of the mixing machine in FIG. 1 are shown in section.

As shown in FIG. 1, a high intensity internal mixing machine of the batch type, generally indicated at 20, in which a pair of non-intermeshing rotors 21 and 22 embodying the present invention can be used to advantage includes a vertically reciprocatable ram 24 movable between a raised position shown in FIG. 1 and a lowered operating position 24' shown in dashed outline. This ram 24 is used to move ingredients to be mixed down into a mixing chamber 26. In its operating position 24', it opposes the forces exerted by materials in the mixing chamber 26 as they are being thoroughly and intensely mixed by the wings to be described later on the two counter-rotating rotors 21 and 22, which are turned about spaced parallel horizontal axes, as shown by arrows 23 and 25. The left rotor 21 as seen in FIG. 1, is turned in a clockwise direction about its axis and the right rotor 22 in a counterclockwise direction. The mixing chamber 26 is shaped to accommodate these two rotors and includes left and right chamber cavities 27 and 28 each of generally circular cylindrical shape. These chamber cavities are positioned in horizontally opposed relationship open toward each other. There is a central region 29 of the mixing chamber 26 which is defined as being located generally between the two rotors 21 and 22.

The ingredients to be mixed are initially introduced into a hopper 30, while the ram 24 is raised, so that the ingredients can enter a chute 32 communicating with the hopper 30 and leading down into the central region 29 of the mixing chamber 26. Then the ram is lowered to push the ingredients down into the mixing chamber and to retain them therein. This ram 24 is shown being operated by a fluid-actuated drive cylinder 34, mounted at the top of the overall housing 35 of the mixing machine 20. The fluid cylinder 34, which may be hydraulic or pneumatic, contains a double-acting piston 36 with a piston rod 38 connected to the ram 24 for lowering and raising the ram. The ram is secured to the lower end of the piston rod 38 below the bottom end 39 of the cylinder 34. Actuating fluid under the desired pressure is fed through a supply line 40 into the upper portion of the cylinder 34 for urging the piston 36 downwardly to the lowered operating position 24'. After the mixing operation has been completed, the ram is retracted back up to its raised position by actuating fluid fed into the cylinder 34 below the piston 36 through a supply line not seen in FIG. 1.

The mixed and homogenized materials are discharged from the bottom of the mixing chamber 26 through a discharge opening normally closed by a door 42 which is held in its closed position during mixing operation by a locking mechanism 44. The door 42 when released by the locking mechanism 44 is swung down around a hinge shaft 46. The door is swung, for example, by a pair of hydraulic torque motors, not shown, mounted on opposite ends of the hinge shaft 46.

Figure 2:
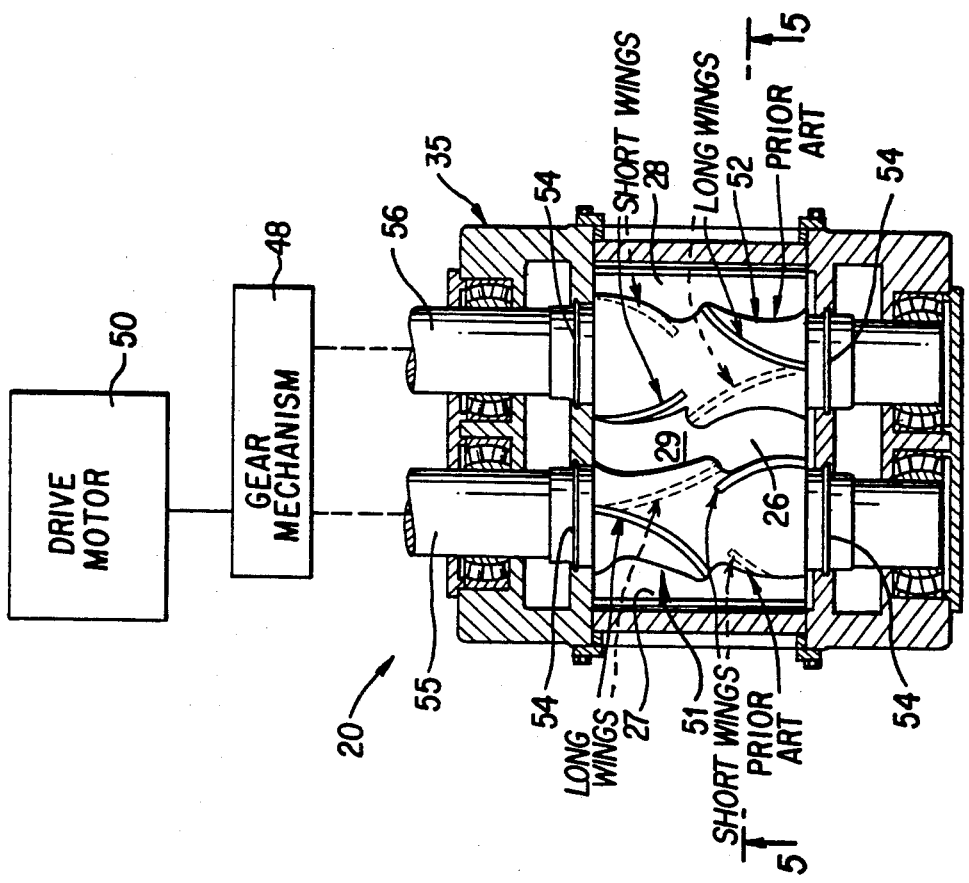
FIG. 2 is an enlarged plan sectional view taken along the line 2—2 in FIG. 1 through the mixing chamber, except that FIG. 2 is showing a pair of non-intermeshing, four-wing rotors of the prior art, wherein the two long wings both originate from the same end of each rotor and the two short wings both originate from the other end of the rotor.

FIG. 2 is a plan sectional view of the mixing mechanism 20 of FIG. 1 taken along the line 2—2, except that the four-wing rotors 51 and 52 which are illustrated are prior art rotors wherein the two long wings both originate from (i.e. have their leading ends at) the same end of each rotor as shown by the legends and arrows, and also the two short wings both originate from the same end of each rotor, being the opposite end from that where the two long wings originate. This FIG. 2 emphasizes that the novel rotors 21 and 22 can be installed in an existing mixing machine 20 for replacing conventional prior art rotors 51 and 52. These new rotors 21 and 22 can also be installed with advantage in a new mixing machine 20 as described.

As shown in FIG. 2, the rotors 51 and 52 or 21 and 22, as the case may be, are rotated in opposite directions 23, 25 by a conventional gear mechanism 48 which is driven by a drive motor 50. This gear mechanism 48 may comprise identical meshing gears for driving the rotors at the same, namely synchronous, speed. Alternatively, this gear mechanism may comprise meshing gears of somewhat different pitch diameters for driving the rotors at different speeds, for example at a speed ratio of 9 to 8, i.e. 1.125 to 1, called a friction gear ratio. The drive motor 50 may be of conventional configuration and preferably includes speed control means for varying the speed of rotation for the rotors, as desired, depending upon the particular ingredients in the mixing chamber 26 and their temperature and viscous state, and depending upon the desired rate of mixing power to be delivered by the rotors.

There are conventional sealing collars 54 (FIG. 2) located immediately adjacent to each end of each rotor for sealing the mixing chamber 26. The ends of the rotors adjacent to the respective collars 54 are often called the "collar end", as will be shown in FIG. 3.

Further detailed information concerning the construction of such a high intensity internal batch mixing machine 20 is set forth in the above-mentioned U.S. Pat. No. 3,610,585, incorporated herein by reference.

Figure 3:
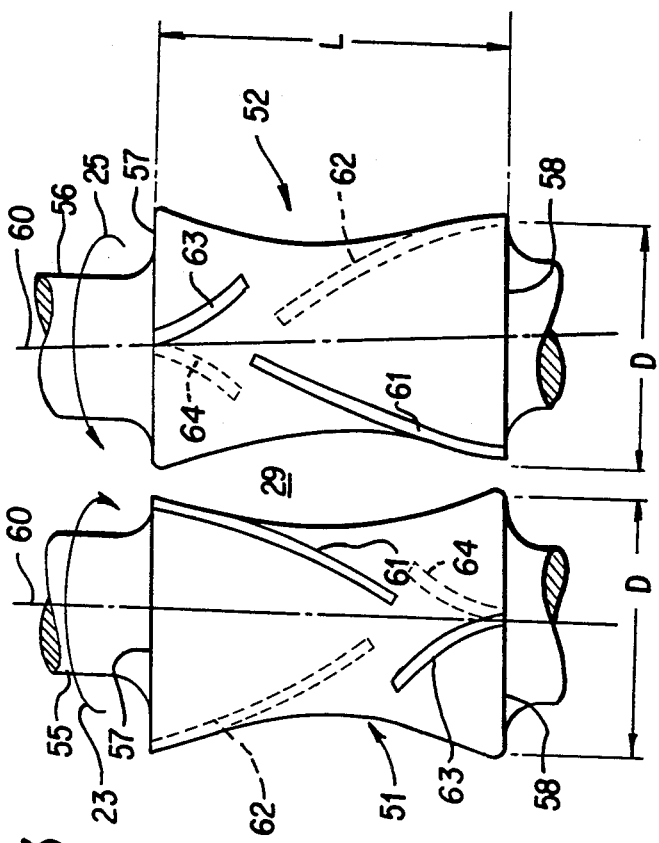
FIG. 3 is an enlarged plan view of the two typical prior art four-wing rotors shown in FIG. 2.

In FIG. 3, the left and right rotors 51 and 52 are shown each having a length "L" measured between their respective collar ends 57 and 58. The collar end 57 connected to the drive shaft 55 or 56 is the "driven end" of the rotor, the other collar end 58 being the "coolant end" or "water end". The rotors contain coolant passageways, and coolant which is usually water is fed into these passageways at the opposite ends from the location of the drive shafts 55 and 56. The rotor envelopes each have a diameter "D". Thus, the unwrapped length of each rotor envelope is "$\pi D$", as shown in FIG. 4.

A prior art rotor 51 and 52 has its two long wings 61 and 62 both originating from the same collar end 57 or 58 and its two short wings 63 and 64 both originating from the opposite collar end. The term "originating from" or similar language signifies that the leading end of the respective helical wing tip 61, 62, 63 or 64 is located at the designated collar end. The rotor axis is indicated at 60, and the angular positions 0°, 90°, 180°, 270° and 360° of the unwrapped rotor envelope are angular positions about the rotor axis. The 0° or 360° angular position is defined for convenience of explanation with reference to FIGS. 3 and 4, as being that position on the rotor envelope adjacent to the central region 29 and lying on a horizontal plane containing the two rotor axes 60.

Prior art rotors have geometries that vary slightly between various mixer sizes. The prior art figures given below for illustrative purposes apply to the rotors for one specific size mixer and are typical for prior art rotors for all size mixers, whose rotors 51, 52 have an L/D ratio of 1.58.

Figure 4:
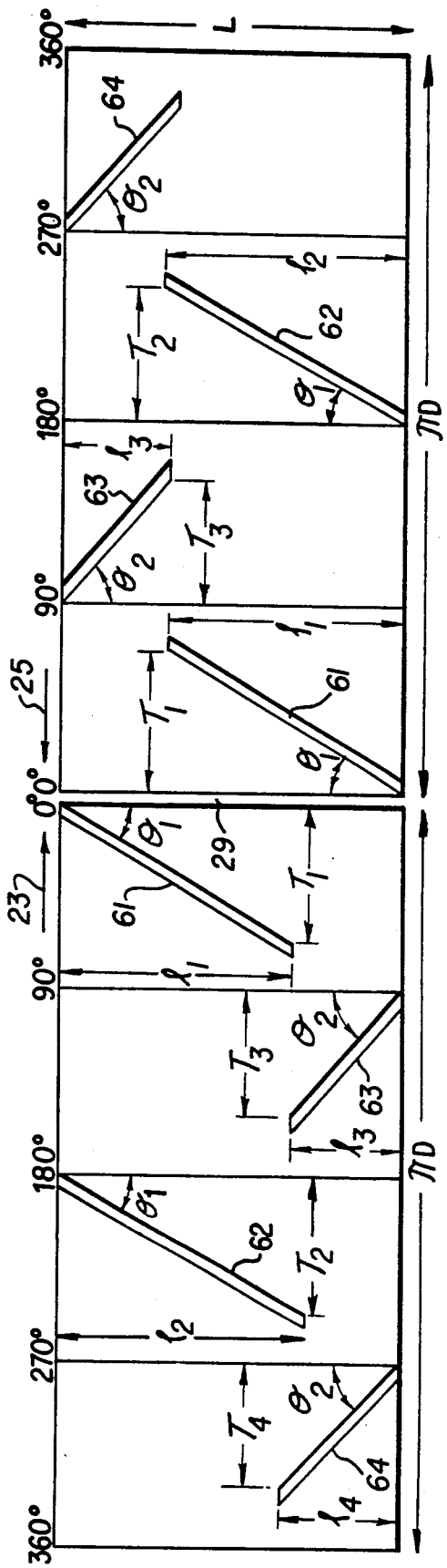
FIG. 4 shows the unwrapped envelopes of the two rotors of FIG. 3 illustrating the unwrapped helical wing tips of the four rotor wings. When the rotor envelope is unwrapped, the helical wing tips appear as straight and diagonally oriented.

The long rotor wing tips 61 and 62 originate at angular positions which are 180° apart as shown in FIG. 4, and the helix angles $A_1$ of the two long rotor wing tips are the same, being 30°. The term "helix angle" means the orientation of the wing tips with respect to the rotor axis 60 or more precisely with respect to a plane containing the rotor axis and intersecting with the wing tip.

The long wing tip 61 has an axial length "$l_1$", and the ratio of $l_1/L$ is 0.66. The twist (wrap) angle $T_1$ of the long wing tip 61 is 70°. The other long wing tip 62 has an axial length $l_2$, and the ratio of $l_2/L$ is 0.67. The twist (wrap) angle of this wing tip 62 is 72°.

The short wing tips 63 and 64 originate at angular positions which are 180° apart and also at angular positions spaced 90° from the originations of the long wing tips 61 and 62. The helix angles $A_2$ of the two short wing tips 63 and 64 are the same being of 48°. These short wing tips 63 and 64 have axial lengths $l_3$ and $l_4$, respectively, the ratio of $l_3/L$ and of $l_4/L$ are 0.31 and 0.33 respectively. The twist (wrap) angles $T_3$ and $T_4$ are 65° and 68°, respectively.

Figure 5:
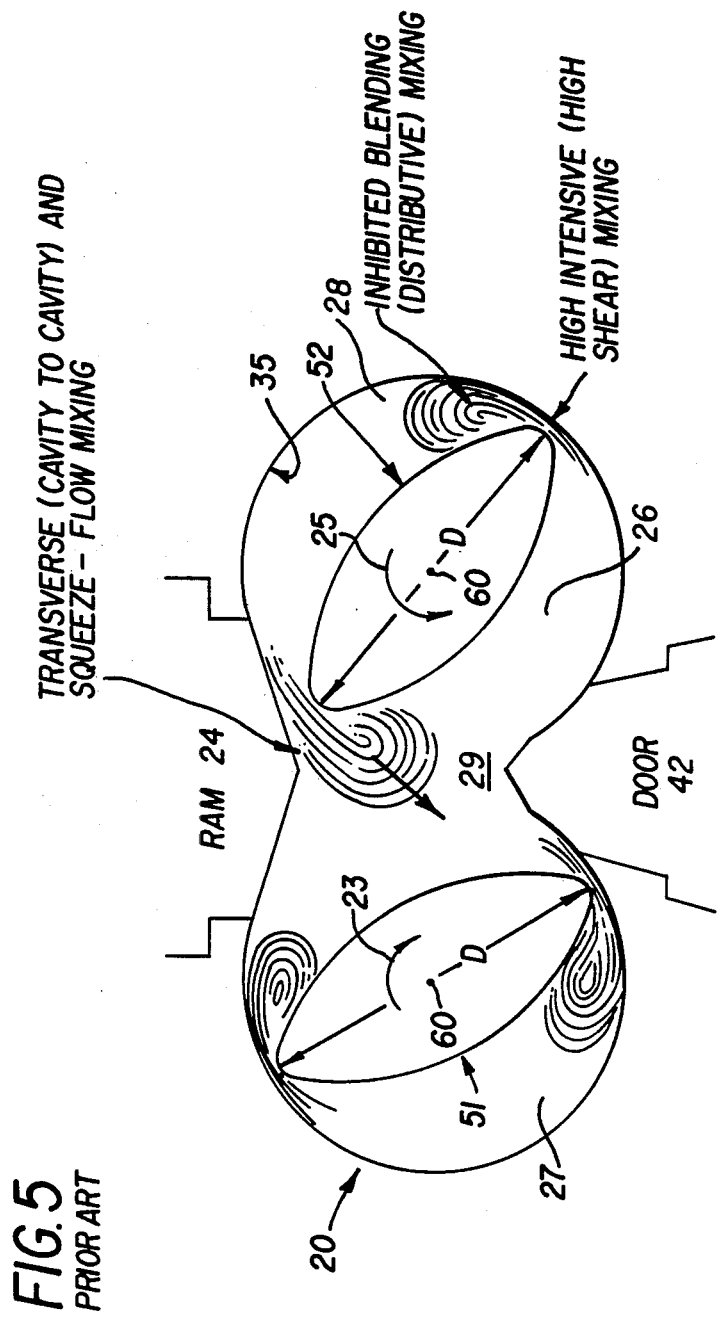
FIG. 5 is a schematic enlarged cross-sectional view of a mixing chamber for purposes of explanation, being similar to a section taken along the line 5—5 in FIG. 2.

The mixing action and types of mixing which occur in the machine 20 with prior art rotors 51, 52 are illustrated in FIG. 5. The principles being employed are as follows:

(a) The long wings of each rotor perform most of the mixing by shearing action (high intensive, high shear) mixing between the wing tip and the wall surface of the chamber cavities 27 and 28 and by pushing the material with an axial component of motion toward the short wings which wipe the material at their end in each chamber cavity 27, 28 of the mixing chamber 26.

(b) The arrangement of the long wings inhibits the distributive mixing (blending) occurring in each chamber cavity, and therefore the prior art rotor arrangements depend heavily on the transfer of material from one chamber cavity to the other to achieve efficient distributive mixing.

(c) The helix angles of the long wings are about 30° which contribute high shearing of the material as discussed above, but these shallow helix angles do not encourage much axial movement of the material in the chamber cavity. In effect, the shallow helix angles of the long wings inhibit axial flow distributive (blending) mixing.

(d) The twist (wrap) angles of the long wings being considerably less than 90° cause the long wings to dwell in the center 29 of the mixing chamber at the horizontal plane defined by the rotor axes 60 for only a relatively short time. This relatively short dwell time causes and allows a large volume of the material to be "sitting" relatively undisturbed in the central region 29 of the mixing chamber for a major part of the total mixing cycle. This large volume in the central region 29 experiences poor heat transfer and considerably less mixing than material elsewhere in the mixing chamber.

It is to be noted that in FIG. 5 that the rotor diameter "D" which is used in FIGS. 3, 4, 5, 6, 7, 8 and 9 is the major diameter as measured from wing tip to wing tip.

Figure 6:
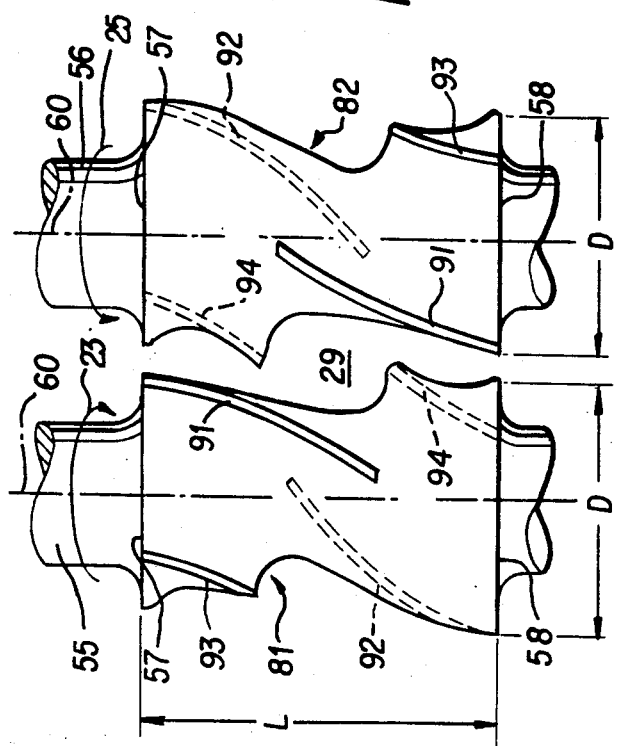
FIG. 6 is a plan view similar to FIG. 3, except that FIG. 6 shows two four-wing rotors embodying the invention.
Figure 7:
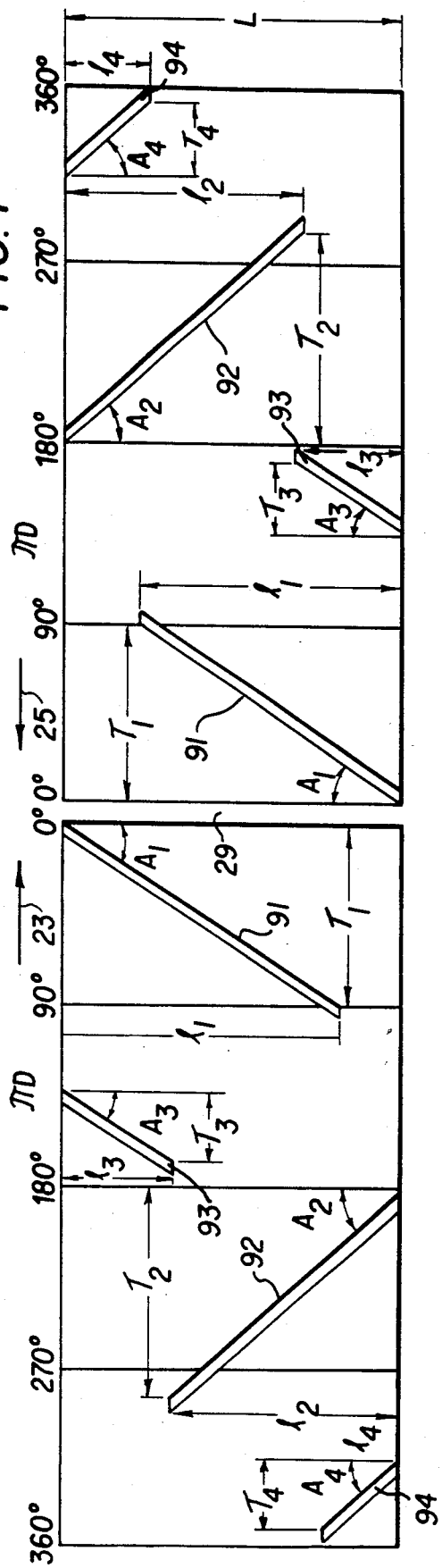
FIG. 7 shows the unwrapped envelopes of the rotors of FIG. 6.

The general object of the present invention is to overcome or in large measure to reduce the shortcomings of prior art non-intermeshing rotors and to enhance the effectiveness and strength of these novel rotors. Shown in FIGS. 6 and 7 are four-wing rotors 81 and 82 embodying the invention. The long wings 91 and 92 on each rotor originate at opposite collar ends 57 and 58 and they are angularly positioned in the range 176° to 184° apart at their originating ends. The wing tip 91 of the first long wing is oriented at a helix angle $A_1$ in the range from 25° to 45° and has a twist angle $T_1$ in the range from 70° to 110°. The wing tip 92 of the second long wing is oriented at a helix angle $A_2$ in the range from 29° to 50°, and has a twist angle $T_2$ in the range from 80° to 120°. The difference between the helix angles $A_1$ and $A_2$ has a preferred range from about 4° to about 10°, and the optimum difference is about 6° to about 8°. The helical length of these two long wings 91, 92 are about the same. The ratio of the axial length $l_1$ of the first long wing 91 to the rotor length L is in the range from 0.60 to 0.85. The ratio of the axial length $l_2$ of the second long wing to L is in the range from 0.55 to 0.80.

The first and second short wing tips 93 and 94 originate at angular positions of 131° to 139° and 311° to 319°, respectively. The helix angle $A_3$ of the first short wing tip is in the range from 25° to 40°, and the helix angle $A_4$ of the second short wing tip is in the range from 29° to 50°. The helical lengths of these short wing tips 93, 94 are about the same. The ratios of the axial lengths $l_3$ and $l_4$ of the respective first and second short wing tips to L are both in the range from 0.10 to 0.40. The first short wing tip 93 has a twist angle $T_3$ in the range from 20° to 50°, and the second short wing tip 94 has a twist angle $T_4$ in the range from 20° to 50°.

A summary of the advantageous ranges of parameters of these new rotors 81 and 82, as shown in FIGS. 6 and 7, is set forth in Table I below:

TABLE I

| | FIGS. 6 & 7, FOUR WINGS | | | |
|---|---|---|---|---|
| | Originating Angular Position | Helix Angle A | Twist Angle T | Ratio l/L |
| Long Wing 91 | 0° | 25° to 45° | 70° to 110° | 0.60–0.85 |
| Long Wing 92 | 176°–184° | 29° to 50° | 80° to 120° | 0.55–0.80 |
| | $A_2-A_1 > 4°$ | | | |
| | $A_2-A_1$ in preferred range of 4° to 10° | | | |
| | Optimum $A_2-A_1 \approx 6°-8°$ | | | |
| Short Wing 93 | 131°–139° | 25° to 45° | 20° to 50° | 0.10–0.40 |
| Short Wing 94 | 311°–319° | 29° to 50° | 20° to 50° | 0.10–0.40 |

NOTE:
The rotors to which the values in this above Table apply have an L/D in the range from 1.4 to 2.1.

An example of parameters for a preferred pair of rotors for advantageous use in a mixing chamber 26 configured for employing rotors having a length L to diameter D ratio of 1.58 is set forth in Table 11 below.

TABLE II

| | FIGS. 6 & 7, FOUR WINGS (L/D = 1.58) | | | |
|---|---|---|---|---|
| | Originating Angular Position | Helix Angle A | Twist Angle T | Ratio l/L |
| Long Wing 91 | 0° | 32° | 90° | 0.79 |
| Long Wing 92 | 176° to 184° | 40° | 109° | 0.71 |
| | | $A_2-A_1 = 8°$ | | |
| Short Wing 93 | 131° to 139° | 32° | 37° | 0.34 |
| Short Wing 94 | 311° to 319° | 40° | 45° | 0.30 |

An example of parameters for a preferred pair of rotors for advantageous use in a mixing chamber 26 configured for employing rotors having a length L to diameter D ratio of 1.42 is set forth in Table III below.

TABLE III

| | FIGS. 6 & 7, FOUR WINGS (L/D = 1.42) | | | |
|---|---|---|---|---|
| | Originating Angular Position | Helix Angle A | Twist Angle T | Ratio l/L |
| Long Wing 91 | 0° | 38° | 90° | 0.73 |
| Long Wing 92 | 176° to 184° | 45° | 104° | 0.64 |
| | | $A_2-A_1 = 7°$ | | |
| Short Wing 93 | 131° to 139° | 38° | 39° | 0.36 |
| Short Wing 94 | 311° to 319° | 45° | 45° | 0.29 |

Figure 10:
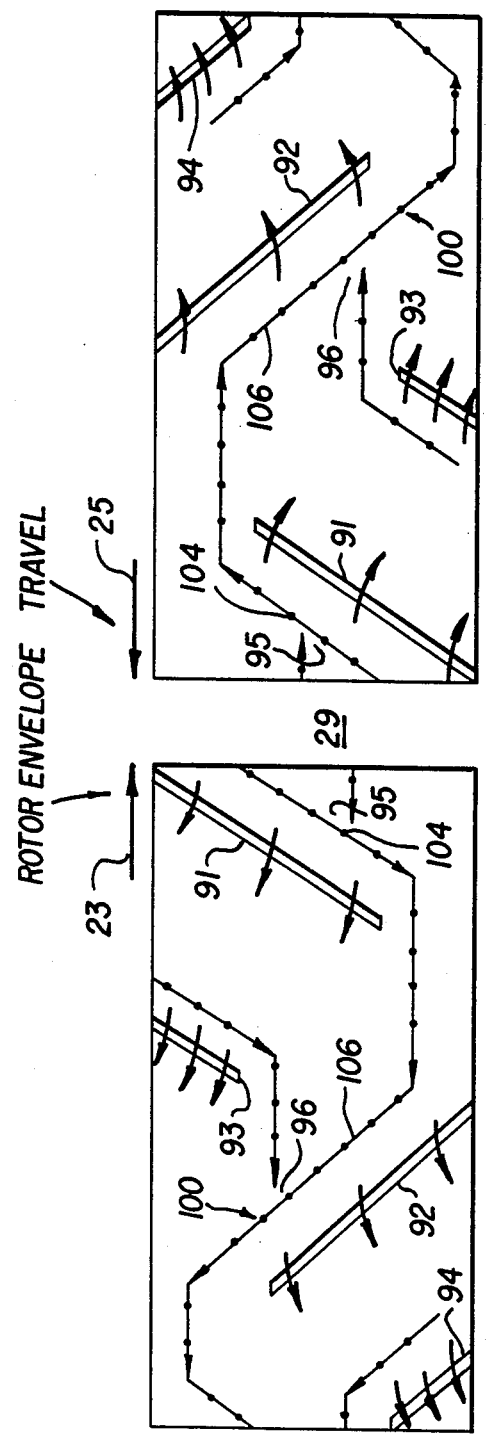
FIG. 10 is a diagram for explaining the enhanced axial mixing action produced in the two rotor cavities by the novel rotors of FIGS. 6 and 7.

The advantageous cooperative mixing actions which are produced by the rotor wings 91, 92, 93 and 94 in the two chamber cavities 27 and 28 of the mixing chamber 26 are shown in FIG. 10. There is a greatly enhanced blending (distributive) mixing 100 produced by rolling banks of material in axial directions with axial movement and flow. In addition, there is also high intensive (high shear) mixing of material passing over the tips of the rotor wings in the chamber cavities. The long wings 92 having the large helix angles $A_2$ (FIG. 7) contribute high axial push (FIG. 10) with somewhat less shearing of the material. These long wings 92 exert powerful axial thrusts on the material in the respective axial direction, thereby rolling and flowing banks of material in the axial directions for producing greatly increased blending (distributive) mixing in axial directions, as compared with the prior rotors 51 and 52 (FIG. 3, 4 and 5). Randomization in this blending by the rolling banks is advantageously produced because of the various axial velocities achieved at 104 and 106 in front of the respective long wings 91 and 92 having differing helix angles $A_1$ and $A_2$. By virtue of their large twist angles $T_2$, up to 120°, these long wings 92 have a considerably increased residence time or dwell time in the chamber center 29, as compared with the long wing 62 (FIGS. 3 and 4) having a twist considerably less than 90°. Their longer residence times and increased axial thrust enable these long wings 92 to force considerably more material to be blended and mixed by forceful distributive mixing in the axial direction. Moreover, these long wings 92 due to their larger twist angle $T_2$ and consequent longer residence time in the central region 29 of the mixing chamber decrease the volume of material "sitting" in this central region 29, thereby forcing more material into the cavity 27 or 28 to become subjected to this enhanced forceful axial distributive mixing action.

The long wings 91 with the smaller helix angle $A_1$ (FIG. 7) contribute high shearing with somewhat less axial push of the material. The axial length $l_1$ of these long wings 91 with the smaller helix angle is somewhat greater than that of the long wings 92. By virtue of their relatively long axial length, these long wings 91 are able to propel some material in an axial direction from their originating ends over near to the other end of the rotor cavity for enhancing the overall mixing action.

The short wings 93 and 94 wipe material at both ends of each rotor chamber and also introduce a slight squeeze flow mixing, as indicated at 95 and 96 (FIG. 10), in each rotor cavity.

The helix angles $A_1$ vs. $A_2$ and $A_3$ vs. $A_4$, respectively of the wings originating from the driven ends 57 of two rotors 81 and 82 installed into the mixing not the same. The difference in the helix angles enables the wings to enhance the transfer of material (transverse mixing) from one chamber cavity to the other, because two opposed wings which happen to be approaching and entering the central region 29 are never in phase opposition along their entire helical length, since their different helix angles soon relatively displace them away from direct phase opposition.

FIGS. 11A through 11F diagrammatically illustrate the various advantageous rotor wing relationships serving to enhance transverse mixing by transferring material from one rotor cavity to the other.

Figure 11A:
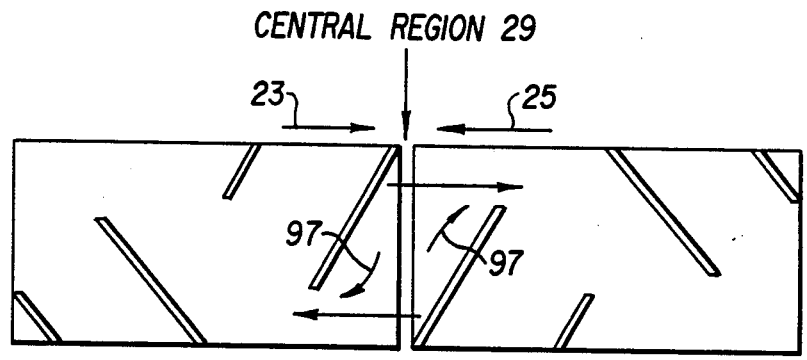
FIG. 11 is a sequence of six diagrams A, B, C, D, E and F of the unwrapped rotor envelopes of the rotors of FIGS. 6 and 7, shown in six different relative angular positions for explaining the enhanced transverse (cavity-to-cavity transfer) mixing produced by these rotors.

In FIG. 11A when two long wings are entering opposite ends of the central region 29, each wing is pushing material in transverse mixing across the central region from chamber cavity to chamber cavity, plus some axial squeeze-flow mixing 97.

Figure 11B:
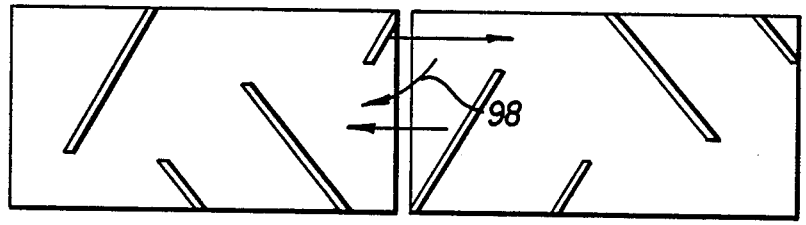

In FIG. 11B when a long and a short wing are entering opposite ends of the central region, each wing is again pushing material transversely across the central region from one cavity to the other, plus some axial squeeze-flow mixing 98 past the trailing end of the short wing.

Figure 11C:
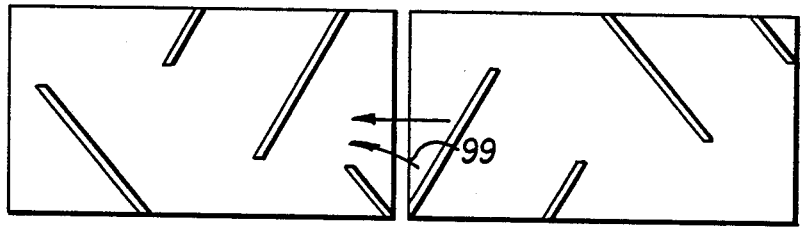

In FIG. 11C when a long and a short wing are entering the same end of the central region, there is transverse mixing from cavity to cavity due to the push of the long wing, plus some squeeze-flow mixing 99 around the trailing end of the short wing.

Figure 11D:
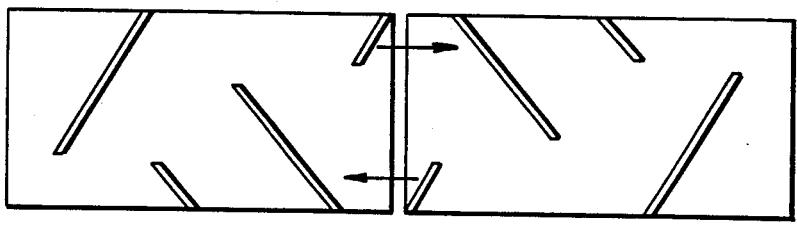

In FIG. 11D when two short wings are entering opposite ends of the central region, each wing is pushing material in transverse mixing across the central region 29.

Figure 11E:
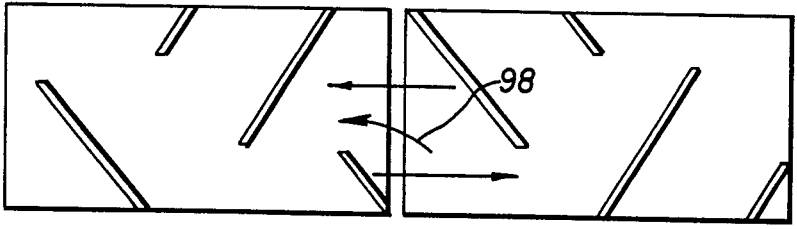

In FIG. 11E is shown the converse of FIG. 11B, with a long wing and a short wing entering opposite ends of the central region. These FIGS. 11B and 11E show advantageous relationships which can never occur with the prior art rotors 51 and 52 (FIGS. 3 and 4), because the latter rotors cannot have a long wing and short wing enter opposite ends of the central region at the same time.

FIG. 11F is an enlarged partial diagram similar to FIGS. 11A-E, except that FIG. 11F shows two opposed long wings 91, 92 entering the same end of the central region 29 at the same time, which never occurs with the prior art rotors 51 and 52. By virtue of the differences in their helix angles creating different axial thrusts, as shown by the different lengths of the dashed axial flow arrows 101, 102, there is produced a novel axial slide shearing of material at the central region.

It is to be noted that the converse of FIG. 11F also occurs when the opposed long wings both enter the other end of the central region, thereby producing this novel axial slide shearing of material in the opposite sense in the central region.

With respect to FIGS. 11A-F, it is to be noted that these various sequences of relationships are automatically produced when the two rotors are driven at unequal speed. Alternatively, any particular phased relationship can be selected and repeatedly produced by installing the rotors at a selected phase relationship and then driving them at equal speed, as will be discussed further below.

Reviewing the enhanced effectiveness and novel mixing interactions produced by two rotors 81, 82 (FIGS. 6 and 7) embodying the present invention, it is seen in FIG. 10 that there is a novel massive blending (distributive) mixing 100 produced by rolling banks of material in axial directions back and forth with axial movement and axial flow of the material being mixed. By virtue of the fact that the long wings 91 and 92 on each rotor originate at opposite rotor ends 57 and 58 they roll banks of material in one axial direction and then back in the other axial direction in each chamber cavity 27, 28 (Please see FIG. 5). Moreover, the rolling banks are propelled at differing angular velocities at 104 and 106 thereby achieving randomization in the blending (distributive) mixing 100. Consequently, the material in each chamber cavity 27 and 28 becomes uniformly blended by this distributive mixing back and forth in axial directions.

It will now be understood why FIG. 5 has the legend "INHIBITED BLENDING (DISTRIBUTIVE) MIXING", because the prior art four-wing rotors 51, 52 (FIGS. 3 and 4) do not produce this massive effective back-and-forth rolling of banks of material in an axial direction, due to the fact that both long wings 61, 62 on a rotor originate at the same collar end of that rotor.

In cooperation with this blending (distributive) mixing 100 (FIG. 10), there is a balanced intensive high shearing type of mixing produced at each position along the axial length of each of the two chamber cavities 27 and 28 as will be appreciated from FIG. 10. In other words, the intensive high shearing action is balanced (and uniform) from end-to-end in each chamber cavity 27 and 28, namely, in each successive plane taken perpendicular to the rotor axis 60, because a long wing and a short wing originate at each end of each rotor. In other words, each axial half of each rotor is substantially equally effective in producing intensive high shear mixing.

Contrarywise, in the prior art rotors 51, 52, the two long wings 61, 62 both originate at the same collar end of the respective rotor. Consequently, it will now be appreciated that the prior art rotor 51 in a left chamber cavity 27 will produce considerably more than half of its high intensity shearing action in the axial half of the chamber cavity near the driven end 57 of the rotor where its two long wings are located; whereas the other prior art rotor 52 in a right chamber cavity 28 will produce considerably more than half of its high intensity shearing action in the axial half of the chamber cavity near the coolant end 58 of the rotor where its two long wings are both located. Thus, there is not a balanced shearing action with the prior rotors 51, 52. There is not a uniformity of shearing action from plantto-plane taken perpendicular to the rotor axes along the axial length of the mixing chamber 26, due to the unbalanced location in axial relationship of the two long wings 61, 62 on the respective rotor.

In addition to the novel massive uniform blending (distributive) mixing 100 (FIG. 10) produced by rolling banks of material back and forth in each chamber cavity 27 and 28 and in addition to the intensive high shear mixing action being balanced and uniform along each chamber cavity from end-to-end in an axial direction, there are novel interactions between the pair or rotors as they approach the central region 29 of the mixing chamber as shown in FIGS. 11B, 11E, 11F and the converse of FIG. 11F when the rotors are being driven at unequal speed.

When these novel rotors 81, 82 are driven at equal speed, then there is a preferred phase relationship between them in my view. This preferred phase relationship is shown in FIG. 10 and also in FIG. 11A (and also in FIG. 11D), namely, the two first long wings 91 approach the central region 29 at the same time. Thus, the other two long wings 92 also approach the central region at the same time. Consequently, during each revolution cycle any material which happens to be located near the central region 29 will experience two powerful transverse mixings plus squeeze-flow mixings between approaching long wings 91 versus 91 and 92 versus 92.

Figure 8:
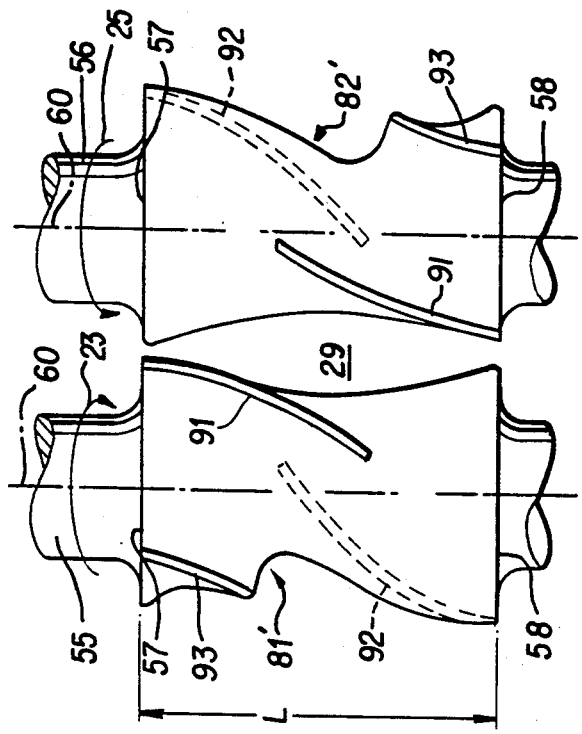
FIG. 8 is a plan view similar to FIG. 6, except that FIG. 8 shows two three-wing rotors embodying the invention.
Figure 9:
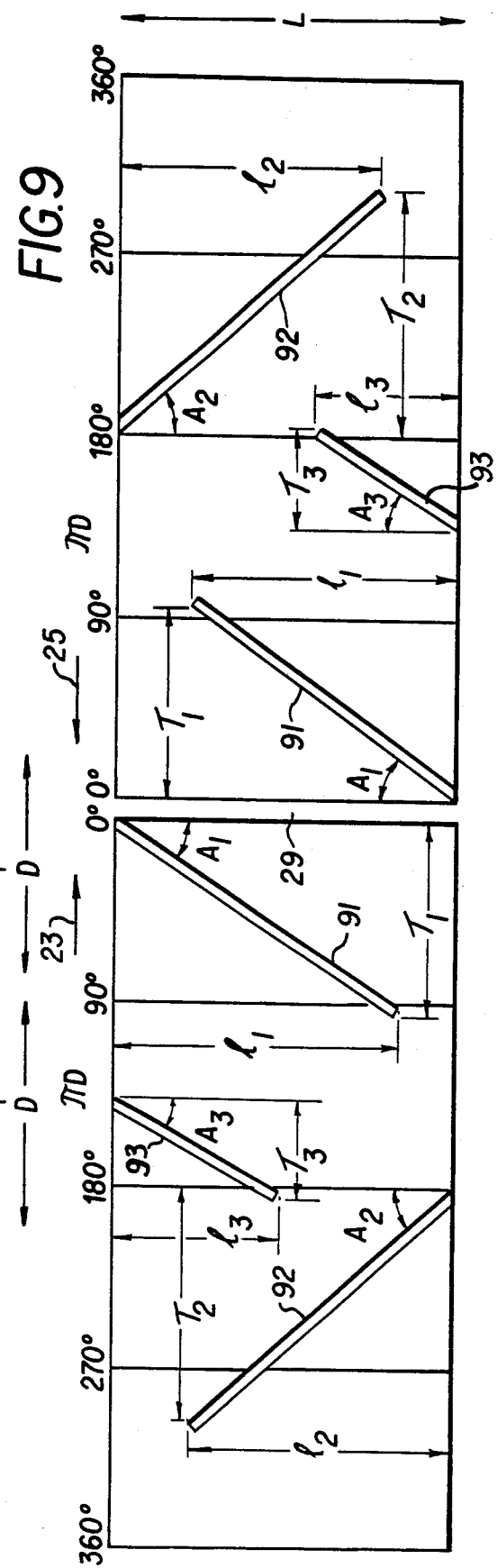
FIG. 9 shows the unwrapped envelopes of the threewing rotors of FIG. 8.

FIGS. 8 and 9 show two new three-wing rotors 81' and 82' each having long wings 91, 92 originating from opposite collar ends 57, 58 of the respective rotor. Only one short wing 93 is included shown originating from the collar end 57. A reason for eliminating one of the short wings is to increase the free (available volume in the mixing chamber 26. In other words, this pair of three-wing rotors 81' and 82' can be installed in a mixing chamber 26 which is too small for installing a pair of four-wing rotors and in which a pair of two-wing rotors would normally be installed, whereby these three-wing rotors enhance the overall performance and productivity of the mixer 20.

A summary of the advantageous ranges of parameters of these new three-wing rotors 81' and 82' is set forth in Table IV below.

TABLE IV

| FIGS. 8 & 9, THREE WINGS | | | |
|---|---|---|---|
| Originating Angular Position | Helix Angle A | Twist Angle T | Ratio l/L |
| Long Wing 91 | 0° | 25° to 45° | 70° to 110° | 0.60-0.85 |
| Long Wing 92 | 176° to 184° | 29° to 50° | 80° to 120° | 0.55-0.80 |
| | $A_2-A_1 > 4°$ | | |
| | $A_2-A_1$ in preferred range 4° to 10° | | |
| | Optimum $A_2-A_1 \approx 6°-8°$ | | |
| Short Wing 93 | 131° to 139° | 20° to 50° | 20° to 50° | 0.20-0.50 |

Note:
The rotors to which the values in this above Table apply have an L/D in the range from 1.4 to 2.1.
Note:
$A_3$ is preferred to be within ±5° of $A_1$.

An example of parameters for a preferred pair of three-wing rotors for advantageous use in a mixing chamber 26 configured for employing rotors having a length L to diameter D ratio of 1.58 is set forth in Table V below.

TABLE V

| FIGS. 8 & 9, THREE WINGS (L/D = 1.58) | | | |
|---|---|---|---|
| Originating Angular Position | Helix Angle A | Twist Angle T | Ratio l/L |
| Long Wing 91 | 0° | 34° | 98° | 0.77 |
| Long Wing 92 | 176° to 184° | 40° | 118° | 0.72 |
| | | $A_2-A_1 = 6°$ | | |
| Short Wing 93 | 131° to 139° | 30° | 48° | 0.45 |

It is to be noted in comparing the specific example of Table II for four-wing rotors and Table V for three-wing rotors, which have the same L/D ratio of 1.58, that to compensate for the missing second short wing in the three-wing rotors, the twist angles of the two long wings and of the short wing are significantly increased for increasing the effective dwell time in the center region 29. The helix angles of the first long wing and of the short wing are decreased for increasing the intensive shearing dispersing action between wing tip and chamber wall.

As shown in FIGS. 12B and 13, the dwell time "DL" at the center line "CL" of the mixer as a portion of the total cycle of revolution of the two rotors is increased markedly for both the new four-wing rotors 81, 82 and the new three-wing rotors 81' and 82', as compared with the prior four-wing rotors 51, 52 shown in FIG. 12A. The significant increase in dwell time DL for these novel four-wing rotors 81, 82 is at least 33%. The increase in dwell time DL for the new three-wing rotors 81' and 82' is at least 42%. This increase in dwell time at the center line of the mixer forces more material into the two chamber cavities 27, 28, so as to become mixed therein by the dynamics described.

In addition to the advantages described above, new rotors embodying the invention provide the following achievements or benefits:

(a) The axial mixing action and transverse distributive mixing are intensified for causing the mixes (batches) to become more homogeneous. This improvement will minimize the number of rejected mixes.

(b) The dispersive mixing or shearing of the material between the wing tips and the wall surface of the rotor cavities is maximized by decrease in the volume of material "sitting" at the center of the mixer. This displacement action will more rapidly cause the mixes to become less viscous and more rapidly homogeneous.

(c) Although these rotors will somewhat reduce the available room in a mixer of given size, they will reduce the current mixing time and the number of rejected mixes. Therefore, these new rotors will increase productivity.

(d) The fatigue or stress failure of rotors under severe loading will be minimized, because the arrangements of the long wings strengthen these rotors.

(e) These two pairs of rotors (whether four-wing or three-wing) can be installed for being driven in the friction gear ratio or equal speed gear configuration, thereby providing flexibility in retro-fitting of existing mixers for improving their mixing performance and productivity.

(f) These rotors provide better mixing and better heat transfer and uniformity of heating the material by reducing the volume of material "sitting" at the center of the mixer, by virtue of the markedly increased twist angles.

(g) In the four-wing rotors, there is a new occurrence of a long wing entering one end of the central region and a short wing entering the other end at the same time for achieving a new transverse (cavity-to-cavity) mixing action.

(h) A novel axial slide shearing mixing occurs when two long wings having different helix angles $A_1$ and $A_2$ enter the same end of the central region at the same time.

While preferred embodiments of this invention have been described in detail, it will be understood that various modifications and alterations of the two rotors may be made without departing from the spirit and scope of the invention, as set forth in the appended claims.

What is claimed is:

1. In an internal mixing machine of the batch type including housing means defining a mixing chamber shaped to accommodate two counter-rotating non-intermeshing winged rotors on parallel horizontal axes in said mixing chamber with a central region of the mixing chamber located generally between said rotors, said housing means having an inlet with associated means for introducing materials into said mixing chamber to be mixed into a homogeneous mass and having a closable outlet for discharging the mixed materials from said mixing chamber and including drive means for rotating said rotors in opposite directions around their respective axes, a pair of non-intermeshing rotors comprising:

first and second rotors each having a driven end and a coolant end and at least three wings with wing tips of generally helical configuration including first and second long wings and at least one short wing, said first long wing on each rotor originating at a first end of the rotor at a zero angular position with respect to the rotor axis and having its wing tip oriented to the rotor axis at a first helix angle $A_1$ in the range from 25° to 45°, said second long wing originating at the second end of the rotor at an angular position with respect to the rotor axis in the range from 176° to 184° and having its wing tip oriented to the rotor axis at a second helix angle $A_2$ greater than $A_1$, said short wing originating at the same end of the rotor as the long wing having the lesser helix angle $A_1$, namely, at said first end of the rotor being the same end where said first wing originates, said short wing originating at said first end of the rotor at an angular position with respect to the rotor axis in the range from 131° to 139° and having the wing tip oriented to the rotor axis at a third helix angle $A_3$ in the range from 20° to 50°, and said first end of said first rotor being the driven end and said second end of said second rotor being the driven end.

2. In an internal mixing machine of the batch type, a pair of non-intermeshing rotors having at least three wings as claimed in claim 1, in which:

said third helix angle $A_3$ of said wing tip of said short wing has a value which is within 5° plus or minus of the value of said first helix angle.

3. In an internal mixing machine of the batch type, a pair of non-intermeshing rotors having at least three wings as claimed in claim 1, in which:

said difference between said helix angles $A_2$ and $A_1$ is about 4° to about 10°.

4. In an internal mixing machine of the batch type, a pair of non-intermeshing rotors having at least three wings as claimed in claim 3, in which:

said wing tip of said first long wing has a twist angle $T_1$ in the range from 70° to 110°.

5. In an internal mixing machine of the batch type, a pair of non-intermeshing rotors having at least three wings as claimed in claim 4, in which:

said wing tip of said second long wing has a twist angle $T_2$ in the range from 80° to 120°.

6. In an internal mixing machine of the batch type, a pair of non-intermeshing rotors having at least three wings as claimed in claim 1, in which:

said wing tip of said short wing has a twist angle $T_3$ in the range from 20° to 50°.

7. In an internal mixing machine of the batch type, a pair of non-intermeshing rotors having at least three wings as claimed in claim 1, in which:

the ratio of the axial length $l_1$ of said wing tip of said first long wing to the rotor length L is in the range from 0.60 to 0.85, and the ratio of the axial length $l_2$ of said wing tip of said second long wing to the rotor length L is in the range from 0.55 to 0.80.

8. In an internal mixing machine of the batch type, a pair of non-intermeshing rotors having at least three wings as claimed in claim 2, in which:

the ratio of the axial length $l_1$ of said wing tip of said first long wing to the rotor length L is in the range from 0.60 to 0.85, and the ratio of the axial length $l_2$ of said wing tip of said second long wing to the rotor length L is in the range from 0.55 to 0.80.

9. In an internal mixing machine of the batch type, a pair of non-intermeshing rotors having at least three wings as claimed in claim 1, in which:

the ratio of the axial length $l_3$ of said wing tip of said short wing to the rotor length L is in the range from 0.20 to 0.50.

10. In an internal mixing machine of the batch type, a pair of non-intermeshing rotors as claimed in claim 1 and having three wings, in which:

said L/D ratio is about 1.58,
said first helix angle $A_1$ is about 34°,
said second helix angle $A_2$ is about 40°, and
said third helix angle $A_3$ is about 30°.

11. In an internal mixing machine of the batch type, a pair of non-intermeshing three-wing rotors as claimed in claim 10, in which:

said wing tip of said first long wing has a twist angle $T_1$ of about 90°, said wing tip of said second long wing has a twist angle $T_2$ of about 118°, and said wing tip of said short wing has a twist angle $T_3$ of about 48°.

12. In an internal mixing machine of the batch type including housing means defining a mixing chamber having two cavities shaped to accommodate two counter-rotating non-intermeshing winged rotors on parallel horizontal axes in said mixing chamber, said cavities being in communication in a central region of the mixing chamber located generally between said rotors, said housing means having an inlet with associated means for introducing materials into said mixing chamber to be mixed into a homogeneous mass and having a closable outlet for discharging the mixed materials from said mixing chamber and including drive means for rotating said rotors in opposite directions around their respective axes, a pair of non-intermeshing rotors comprising:

first and second rotors each having a driven end and a coolant end and four wings with wing tips of generally helical configuration including first and second long wings and first and second short wings, said rotors having an axial length L and a diameter D and having a ratio L/D in the range from 1.4 to 2.1, said first long wing on each rotor originating at a first end of the rotor at a zero angular position with respect to the rotor axis and having its wing tip oriented at a first helix angle $A_1$ in the range from 25° to 45°, said second long wing on each rotor originating at the second end of the rotor at an angular position with respect to the rotor axis in the range from 176° to 184° and having its wing tip oriented to the rotor axis at a second helix angle greater than $A_1$, said second helix angle $A_2$ being greater than said first helix angle $A_1$, said wing tip of said first long wing having an axial length $l_1$ whose ratio to the axial length L of the rotor is in the range from about 0.60 to about 0.85, said wing tip of said second long wing having an axial length $l_2$ whose ratio to said axial length L is in the range from about 0.55 to about 0.80, said first short wing originating at said first end of the rotor at an angular position with respect to the rotor axis in the range from 131° to 139° and having its wing tip oriented to the rotor axis at a third helix angle $A_3$ in the range from 25° to 45°, said second short wing originating at said second end of the rotor at an angular position with respect to the rotor axis in the range from 311° to 319° and having its wing tip oriented to the rotor axis at a fourth helix angle $A_4$ in the range from 29° to 50?, said first end of said first rotor being the driven end and said second end of said second rotor being the driven end, and said first and second long wings of each rotor as they revolve in their respective chamber cavities producing blending, distributive mixing of material in the respective cavity by rolling banks of material back and forth with axial components of motion in the respective cavities.

13. In an internal mixing machine of the batch type, a pair of non-intermeshing four-wing rotors as claimed in claim 12, in which:

said second helix angle $A_2$ is greater than said first helix angle $A_1$ by an amount in the range from about 4° to about 10°.

14. In an internal mixing machine of the batch type, a pair of non-intermeshing four-wing rotors as claimed in claim 12, in which:

said third helix angle $A_3$ is about equal to said first helix angle $A_1$, and said fourth helix angle $A_4$ is about equal to said second helix angle $A_2$.

15. In an internal mixing machine of the batch type, a pair of non-intemeshing four-wing rotors as claimed in claim 14, in which:

said first and second long wings of each rotor produce randomization of the blending, distributive mixing of material in the respective cavity by rolling banks of material back and forth with axial components of motion having differing velocities in opposite axial directions in the respective cavities.

16. In an internal mixing machine of the batch type, a pair of non-intermeshing four-wing rotors as claimed in claim 12, in which:

the difference between said second helix angle $A_2$ and said first helix angle $A_1$ is about 6° to about 8°.

17. In an internal mixing machine of the batch type, a pair of non-intermeshing four-wing rotors as claimed in claim 12, in which:

said wing tip of said first long wing has a twist angle $T_1$ in the range from 70° to 110°, and said wing tip of said second long wing has a twist angle $T_2$ in the range from 80° to 120°.

18. In an internal mixing machine of the batch type, a pair of non-intermeshing four-wing rotors as claimed in claim 15, in which:

the helical length of the wing tip of said first long wing is within the range of 95% to 110% of the helical length of the wing tip of said second long wing.

19. In an internal mixing machine of the batch type, a pair of non-intermeshing four-wing rotors as claimed in claim 15, in which:

the wing tip of said first short wing has a twist angle $T_3$ in the range from 20° to 50°, and the wing tip of said short wing has a twist angle $T_4$ in the range from 20° to 50°.

20. In an internal mixing machine of the batch type, a pair of non-intermeshing four-wing rotors as claimed in claim 19, in which:

the helical lengths of said first and second short wings are about equal.

21. In an internal mixing machine of the batch type, a pair of non-intermeshing four-wing rotors as claimed in claim 14, in which:

said ratio of L/D is about 1.42, said first helix angle $A_1$ is about 38°, said second helix angle $A_2$ is about 45°, said wing tip of said first long wing has a first twist angle $T_1$ of about 90°, and said wing tip of said second long wing has a second twist angle $T_2$ of about 104°.

22. In an internal mixing machine of the batch type, a pair of non-intermeshing four-wing rotors as claimed in claim 21, wherein:

said wing tip of said first short wing has a twist angle $T_3$ of about 30°, and said wing tip of said second short wing has a twist angle $T_4$ of about 45°.

23. In an internal mixing machine of the batch type, a pair of non-intermeshing four-wing rotors as claimed in claim 14, in which:

said ratio of L/D is about 1.58, said first helix angle $A_1$ is about 32°, said second helix angle $A_2$ is about 40°, said wing tip of said first long wing has a first twist angle $T_1$ of about 90°, and said wing tip of said second long wing has a second twist angle $T_2$ of about 109°.

24. In an internal mixing machine of the batch type, a pair of non-intermeshing four-wing rotors as claimed in claim 23, in which:

said wing tip of said first short wing has a twist angle $T_3$ of about 37°, and said wing tip of said second short wing has a twist angle $T_4$ of about 45°.

25. In an internal mixing machine of the batch type, including housing means defining a mixing chamer shaped to accomodate two counter-rotating non-intermeshing winged rotors on parallel horizontal axes in said mixing chamer, said housing means having a closable inlet for introducing materials into the mixing chamber and a closable outlet for discharging the mixed materials from said mixing chamber, a pair of improved non-intermeshing four-wing rotors comprising:

first and second non-intermeshing rotors each having four wings, each wing with a wing tip of generally helical configuration, including first and second long wings and first and second short wings, said first long wing on each rotor having its wing tip originating at a first end of the rotor at a zero angular position with respect to the rotor axis and having its wing tip oriented at a first helix angle $A_1$ in the range from 25° to 45°, said second long wing on each rotor having its wing tip originating at a second end of the rotor at an angular position with respect to the rotor axis in the range from 176° to 184° and having its wing tip oriented at a second helix angle $A_2$ in the range from 29° to 50°, said first short wing having its wing tip originating at the first end of the rotor at an angular position with respect to the rotor axis in the range from 131° to 139° and having its wing tip oriented to the rotor axis at a third helix angle $A_3$ in the range from 25° to 45°, said second short wing having its wing tip originating at the second end of the rotor at an angular position with respect to the rotor axis in the range from 311° to 319° and having its wing tip oriented at a fourth helix angle $A_4$ in the range from 29° to 50°, said first and second rotors being installed in said mixing chamber with the first end of the first rotor at the same end of said chamber as the second end of the second rotor.

26. In an internal mixing machine including housing means defining a mixing chamber with respective cavities shaped to accommodate first and second counter-rotating non-intermeshing winged rotors on parallel horizontal axes in said respective cavities, said cavities communicating in a central region of the mixing chamber located generally between said rotors, said mixing chamber having an inlet and an outlet, said machine including drive means for rotating said rotors in opposite directions around their respective axes, wherein said first and second rotors each has a driven end and a coolant end and at least three wings with wing tips of generally helical configuration including first and second long wings and at least one short wing, said first and second non-intermeshing rotors comprising:

said first long wing on each rotor originating at a first end of the rotor at a zero angular position with respect to the rotor axis and having its wing tip oriented to the rotor axis at a first helix angle $A_1$ in the range from about 25° to about 45°, said second long wing originating at the second end of the rotor at an angular position with respect to the rotor axis in the range from about 176° to about 184° and having its wing tip oriented to the rotor axis at a second helix angle $A_2$ greater than $A_1$, said short wing originating at the same end of the rotor as said first long wing which has the lesser helix angle $A_1$ and said short wing originating at an angular position with respect to the rotor axis in the range from about 131° to about 139°, said short wing having its wing tip oriented to the rotor axis at a third helix angle $A_3$ in the range from about 20° to about 50°, and said first end of said first rotor being the driven end which is driven by said drive means, and said second end of said second rotor being the driven end which is driven by said drive means.

27. In an internal mixing machine, first and second non-intermeshing rotors as claimed in claim 26, in which:

said second helix angle $A_2$ is greater than said first helix angle by an angular difference of about 4°.

28. In an internal mixing machine first and second non-intermeshing rotors as claimed in claim 27, in which: said second helix angle $A_2$ is greater than said first helix angle $A_1$ by an angular difference in the range from about 4° to about 10°.

29. In an internal mixing machine, first and second non-intermeshing rotors as claimed in claim 28, in which: said third helix angle $A_3$ of said wing tip of said short wing has an angular value which is within about 5° plus or minus of the angular value of said first helix angle $A_1$.

30. In an internal mixing machine, first and second non-intermeshing rotors as claimed in claim 29, in which: said wing tip of said first long wing has a twist angle $T_1$ in the range from a bout 70° to about 110°, and said wing tip of said second long wing has a twist angle $T_2$ in the range from about 80° to about 120°.

* * * * *